US009292856B1

(12) United States Patent
Niederstrasser et al.

(10) Patent No.: US 9,292,856 B1
(45) Date of Patent: Mar. 22, 2016

(54) AUDIENCE DUPLICATION FOR PARENT-CHILD RESOURCE PAIRS

(75) Inventors: Bonnie Niederstrasser, Reston, VA (US); Harvir Singh Bansal, Mississauga (CA); Ryan Jones, Chicago, IL (US); Han Yan, Willowbrook, IL (US)

(73) Assignee: comScore, Inc., Reston, VA (US)

( * ) Notice: Subject to any disclaimer, the term of this patent is extended or adjusted under 35 U.S.C. 154(b) by 700 days.

(21) Appl. No.: 13/456,163

(22) Filed: Apr. 25, 2012

(51) Int. Cl.
*G06Q 10/00* (2012.01)
*G06Q 30/02* (2012.01)
*G06Q 10/06* (2012.01)

(52) U.S. Cl.
CPC .............. *G06Q 30/02* (2013.01); *G06Q 10/06* (2013.01)

(58) Field of Classification Search
USPC ........................................ 709/224; 705/7, 14
See application file for complete search history.

(56) References Cited

U.S. PATENT DOCUMENTS

| 2003/0105660 | A1* | 6/2003 | Walsh et al. ................... 705/10 |
| 2009/0292587 | A1* | 11/2009 | Fitzgerald ...................... 705/10 |
| 2009/0307061 | A1* | 12/2009 | Monighetti et al. ............ 705/10 |
| 2009/0307084 | A1* | 12/2009 | Monighetti et al. ........ 705/14.45 |
| 2010/0115093 | A1* | 5/2010 | Rice .............................. 709/224 |
| 2011/0246641 | A1* | 10/2011 | Pugh et al. .................... 709/224 |
| 2012/0084133 | A1* | 4/2012 | Ross et al. ................. 705/14.27 |
| 2012/0144016 | A1* | 6/2012 | Zhang et al. .................. 709/224 |
| 2013/0145022 | A1* | 6/2013 | Srivastava et al. ............ 709/224 |
| 2013/0151687 | A1* | 6/2013 | Mooneyham ................. 709/224 |

OTHER PUBLICATIONS

Danaher, Peter J., "A Canonical Expansion for Multivariate Media Exposure", JMR, Journal of Marketing Research, Aug. 1991, 28, 3; ABI/INFORM Global, pp. 361-367.
Kim, Hyo Gyoo "A Canonical Sequential Aggregation Media Model", Dissertation Presented to the Faculty of the Graduate School of the University of Texas at Austin in Partial Fulfillment of the Requirements for the Degree of Doctor of Philosophy, May 2005, 563 pages.

\* cited by examiner

*Primary Examiner* — Natisha Cox
(74) *Attorney, Agent, or Firm* — Fish & Richardson P.C.

(57) ABSTRACT

A combined reach can be determined for multiple resources. Usage data, including audience duplication data, is used to generate audience duplication measurements for pairs of the resources. A child-resource pair is identified, and the audience duplication measurement for that resource pair is modified. The modified measurement is used to determine a combined reach for the multiple resources. A report is also generated based on the combined reach.

21 Claims, 4 Drawing Sheets

AUDIENCE DUPLICATION FOR PARENT-CHILD RESOURCE PAIRS

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one aspect, usage data that indicates accesses to a plurality of different resources by one or more members of an audience and includes information about audience duplication across one or more of the resources is accessed. Audience duplication measurements for pairs of resources in the plurality of different resources are generated based on the usage data. At least one of the pairs of resources is determined to be a parent-child resource pair. A parent-child resource pair includes two resources with a parent-child relationship such that a first one of the two resources is a parent resource and a second one of the two resources is a child resource. The parent-child resource pair has an associated audience duplication measurement generated based on the usage data. In response to determining that at least one of the pairs of resources is a parent-child resource pair, the audience duplication measurement associated with the parent-child resource pair is modified to generate a modified audience duplication measurement. A combined reach representing a number of accesses of the resources by unique members of the audience is determined based at least on the usage data and the modified audience duplication measurement. A report is generated based on the combined reach.

Implementations may include one or more of the following features. The audience duplication information may be the correlation data calculated between each pair of the resources. The audience duplication measurement associated with the parent-child resource pair may be the pairwise correlation coefficient for the parent-child resource pair. Modifying the pairwise correlation coefficient for the parent-child resource pair may involve multiplying the pairwise correlation coefficient by a factor based on the ratio between the usage of the child resource and the usage of the parent resource. The factor may proportional to $(1-p_c/p_p)$, where $p_c$ is the usage of the child resource and $p_p$ is the usage of the parent resource. The adjusted combined reach may be calculated based on the product of the measured unique audience for each of the resources multiplied by an adjustment factor, and the adjustment factor may be calculated using the adjusted pairwise correlation coefficients.

Determining that the parent-child relationship exists may involve identifying that the audience duplication of usage of the parent-child pair is equal to the usage of the child resource. The child resource may include one or more websites, and the parent resource may include all of the websites of the child resource as well as one or more other websites.

The resources may be hosted on servers, and the members of the audience may access the resources using client systems that send requests for the resources to the servers across a network.

The combined reach may also be determined based on one or more of the generated audience duplication measurements.

The modification of the audience duplication measurement may take into account an observed negative relationship between a parent-child pair and combined reach such that the resulting combined reach determined based on the modified audience duplication measurement is less than a combined reach determined using the same data but the unmodified audience duplication measurement.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

Figure 1:
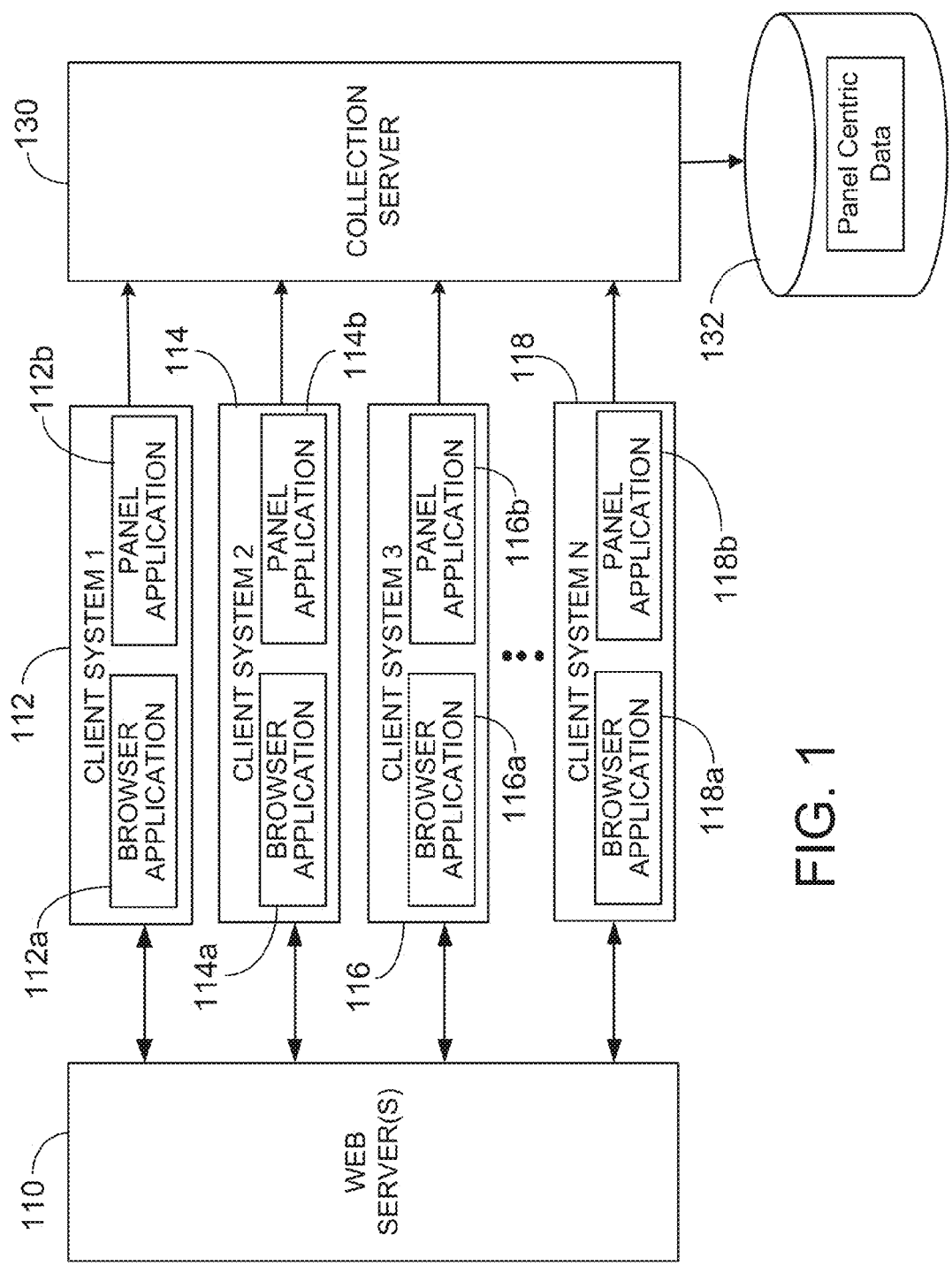
FIG. 1 illustrates an example of a system in which a panel of users may be used to perform Internet audience measurement.

In general, webpage or other resource accesses by client systems may be recorded, and those accesses may be analyzed to develop audience measurement reports. Data about resource accesses can be collected using a panel-based approach. A panel-based approach generally entails installing a monitoring application on the client systems of a panel of users. The monitoring application then collects information about the webpage or other resource accesses and sends that information to a collection server. This information can then be used to determine various metrics that relate to audience measurement.

One useful metric for audience measurement is reach. Reach for a resource or group of resources is the fraction of the total audience or population that has accessed or viewed the resource at least once. For instance, in the case of webpage accesses, the reach may be the fraction of the total Internet population (or, for example, that population in a particular geographic area) that has accessed a particular webpage. The combined reach for two or more resources is the fraction of the audience that has seen at least one of the resources.

While a web site's reach may be calculated directly from the total number of views it has received, that may not be as accurate as desired because a single audience member viewing the site multiple times should count as one member of the audience for purpose of calculating reach. For the a similar reason, when calculating combined reach, adding the reach of each of the resources may overestimate the actual reach, because it doesn't take into account the audience duplication (for example, the fraction of the audience that viewed both resources). As an extreme example, if 40% of the audience viewed a first web entity and then followed a link to a second web entity, each of those entities would have 40% reach from these views, but the combined reach of the two entities together would also be 40%. In practice, the combined reach of two entities each having an individual reach of 40% will be somewhere between 40% and 80% depending on the amount of audience duplication between the two of them.

The techniques described in this document involve one or more corrections that may allow for a more accurate calculation of the combined reach of multiple resources based on available data about audience accesses of those resources.

For instance, sometimes in assessing multiple resources, one or more of the listed resources may actually represent a subset or superset of another one of the resources. The terms "parent" and "child" can refer to these resources where all views measured for the "child" also count as views of the "parent." In this case, the combined reach of the two resources may be considered equal to the child's reach, but this may overestimate the impact of the audience duplication of the parent-child pair in calculating the combined reach of the full set of resources. In order to allow for this situation, some implementations employ a modification of the value used to represent the audience duplication of the parent-child pair to account for the parent child relationship. Equations using the modified value may, in some cases, more accurately estimate the combined reach of the multiple resources.

FIG. 1 illustrates an example of a system 100 in which a panel of users may be used to collect data for Internet audience measurement. The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about this resource access is sent by each client system 112, 114, 116, and 118 to a collection server 130. This information may be used to understand the usage habits of the users of the Internet.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 112, 114, 116, and 118 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies The users in the panel may be recruited by an entity controlling the collection server 130, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, a monitoring application is installed on the user's client system. The monitoring application collects the information about the user's use of the client system to access resources on the Internet and sends that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112b, 114b, 116b, and 118b, also referred to as a panel application, is installed on each of the client systems 112, 114, 116, and 118. Accordingly, when a user of one of the client systems 112, 114, 116, or 118 employs, for example, a browser application 112a, 114a, 116a, or 118a to visit and view web pages, information about these visits may be collected and sent to the collection server 130 by the monitoring application 112b, 114b, 116b, and 118b. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system. The monitoring application also may collect and send information about the requests for resources and subsequent responses. For example, the monitoring application may collect the cookies sent in requests and/or received in the responses. The collection server 130 receives and records this information. The collection server 130 aggregates the recorded information from the client systems and stores this aggregated information in the database as panel data 132.

The panel data 132 may be analyzed to determine the visitation or other habits of users in the panel, which may be extrapolated to the larger population of all Internet users. The information collected during a particular usage period (session) can be associated with a particular user of the client system (and/or his or her demographics) that is believed or known to be using the client system during that time period. For example, the monitoring application may require the user to identify his or herself, or techniques such as those described in U.S. Pat. No. 7,260,837 or U.S. Pat. No. 7,930,285, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or client systems) visiting certain web pages or groups of web pages, or unique visitors within a particular demographic visiting certain web pages or groups of web pages. This data may also be used to determine other estimates, such as the frequency of usage per user (or client system), average number of pages viewed per user (or client system), and average number of minutes spent per user (or client system).

In some implementations and as further described below, this data may be used across multiple vehicles, such as multiple websites and categories of websites, to determine a number of unique visitors across these different vehicles. Because the panel data includes visitor behavior across multiple vehicles, it is possible to use the panel data sample to determine not only the reach of each individual site, but also the degree of overlap between views of related sites. This audience duplication measurement can be useful when determining where additional advertisements are more likely to result in additional unique views rather than overlapping with existing views—that is, to determine where the greatest increase to market reach exists with ad spend.

Figure 2:
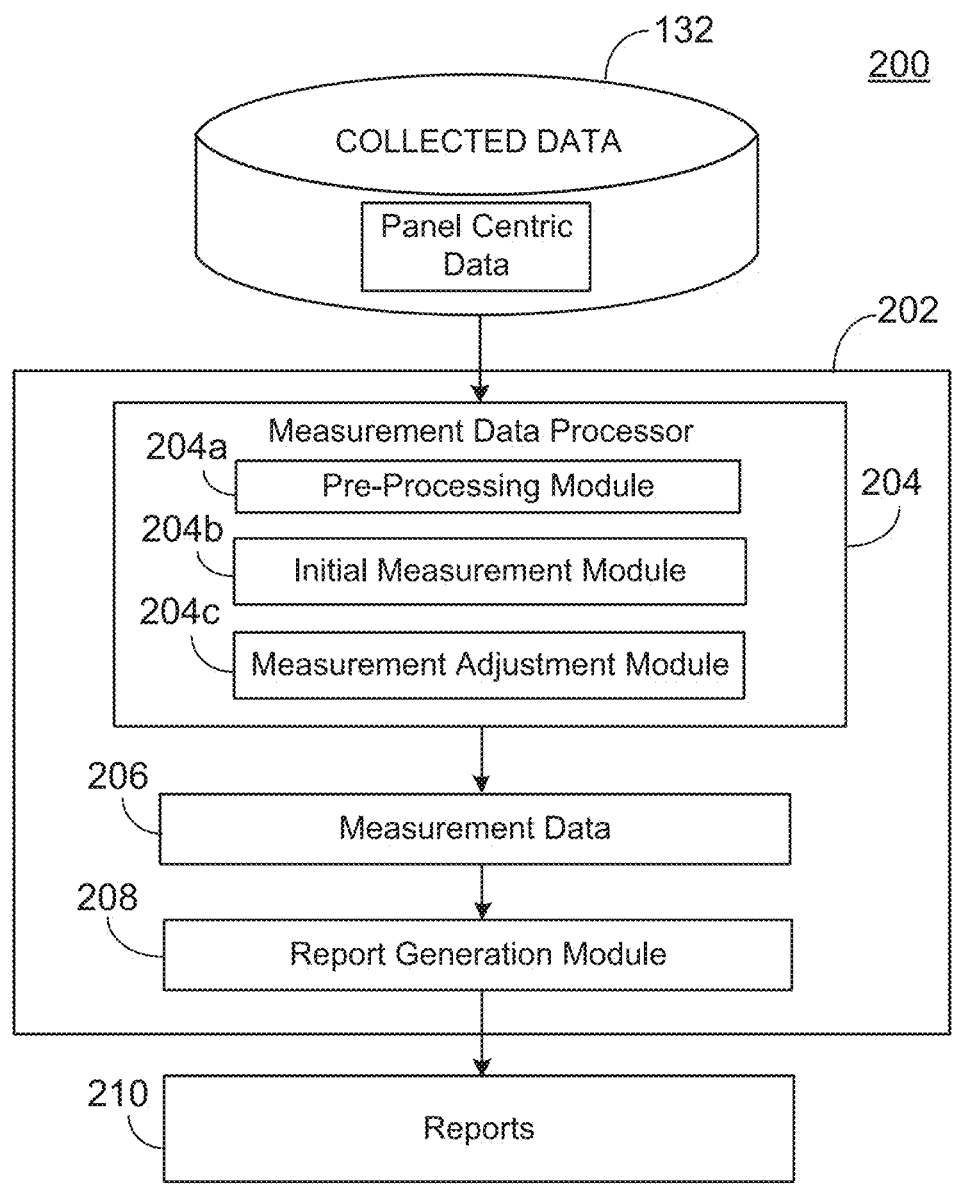
FIG. 2 illustrates an example of a system in which panel data can be used to generate measurement data.

FIG. 2 illustrates an example of a system 200 in which panel data 132 can be used to generate measurement data 206. The system 200 includes a reporting server 202. The reporting server 202 may be implemented using, for example, a general-purpose computer capable of responding to and executing instructions in a defined manner, a personal computer, a special-purpose computer, a workstation, a server, or a mobile device. The reporting server 202 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 202.

The reporting server 202 executes instructions that implement a measurement data processor 204 and a report generation module 208. The measurement data processor 204 includes a pre-processing module 204a, an initial measurement module 204b, and a measurement adjustment module 204c. The measurement data processor 204 may implement a process, such as that shown in FIG. 4, to generate adjusted measurement data 206 based on the panel data 132. The report generation module 208 may use the adjusted measurement data 206 to generate one or more reports 210 that include information regarding client system accesses of one or more resources.

Figure 3:
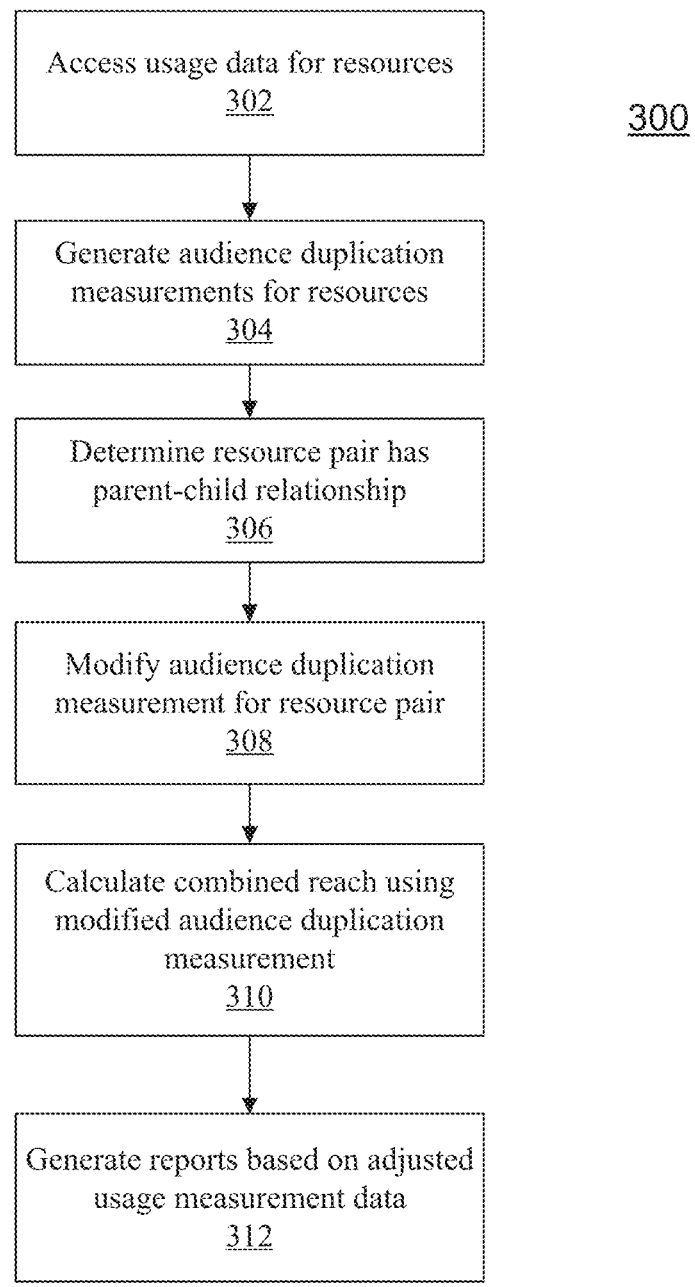
FIG. 3 is a flow chart illustrating an example of a process for determining audience measurement reports for a given web page or collection of web pages.

FIG. 3 is a flow chart illustrating an example of a process 300 for adjusting audience duplication measurements based on usage data. The following describes the process 300 as being performed by the pre-processing module 204a, the initial measurement module 204b, the measurement adjustment module 204c, and the report generation module 208. However, the process 300 may be performed by other systems or system configurations.

The pre-processing module 204a accesses the panel data 132, which represents usage data for a plurality of different sets of resources (302). The panel data 132 may include records that reflect the URLs or other identifiers of web pages or other resources accessed, the times those pages or resources were accessed, identifiers of the client systems that accessed the resources, and information about the requests and responses used to access the resources (for example, cookies sent in requests and/or received in the responses).

Because the usage data is panel-centric and therefore identifies resource access with the panel identified as having accessed the resource, the usage data includes data on audience duplication. Where a single audience member is responsible for the usage of different resources, that audience duplication information is available as part of the accessed data 132.

The panel data 132 that is accessed by the pre-processing module 204a may be the data that is aggregated for a certain, previous time period. For example, the accessed data may be the panel data 132 aggregated over the previous 30 days.

The pre-processing module 204a performs one or more pre-processing functions on the accessed panel data 132. For example, the pre-processing module 204a may process the raw panel data 132 to form state data that represents the complete fact of usage in a single record. For instance, for web page visitation, a record in the state data may indicate that a particular user, on a particular date, at a particular time, accessed web page B (as represented by the URL for that web page), using a particular client system. The pre-processing module 204a also may match some or all of the URLs in the records of the state data to patterns in a dictionary of the Internet, which may organize various different URLs into digital media properties, reflecting how Internet companies operate their businesses. Each pattern may be associated with a web entity, which may be a web page or collection of web pages that are logically grouped together in a manner that reflects how Internet companies operate their business. For example, the various web pages that are included in the finance.yahoo.com domain may be logically grouped together into a single web entity (e.g., Yahoo Finance). The dictionary may include a number of hierarchical web entities to reflect various Internet media companies and how those companies arrange their web properties. For example, the Yahoo Finance web entity may be considered a subset of the Yahoo web entity, which may cover all of the various web pages included in the yahoo.com domain. The Yahoo web entity may include other web entities, such as a Yahoo Health web entity (associated with the various web pages in the health.yahoo.com domain). The pre-processing module $204a$ may associate a given state record with the lowest-level web entity associated with the pattern matching the URL in the state record.

The pre-processing module $204a$ may also remove from the panel data $132$ records for users that are not to be included in the reporting sample. For example, there may be rules that are evaluated to insure that a complete record of a user's usage and non-usage during the reporting period is received. If those rules are not met, the user may be removed from the reporting sample. Also, a user may be removed if he or she does not meet certain criteria, such as being in a particular geographic area.

In addition, the pre-processing module $204a$ may remove certain types of records. For instance, records that reflect redirects or that reflect non-human initiated request (e.g., requests made as part of rendering a web page) may be removed.

Pre-processing of the panel data $132$ may also involve delineating between classes of client systems. At times, it may be desirable to segment reports according to classes of client systems. For example, in one implementation, the reports and underlying data, at least initially, are segmented into work vs. home client systems, with home client systems being those that are used at home while work client systems are those used at work. These two subpopulations can be identified and separated in the panel data $132$ because users self-identified the machines as home or work (or another class) when registering.

The initial measurement module $204b$ determines initial usage measurement data based on the pre-processed site centric data, including generating audience duplication measurements for the resources ($304$). For example, the initial measurement module $204b$ may determine an initial measurement of unique visitors for a given web entity. Unique visitors may represent the number of unique people that requested and/or viewed one of the web pages of the web entity. As another example, the initial measurement module $204b$ may determine an initial measurement of page views for a given web entity. Page views may represent the number of times the web pages for a web entity were requested and/or viewed (regardless of whether the web pages were requested or viewed by a unique person).

In addition to identifying unique visitors for each web entity, the system also calculates unique visitors across multiple web entities. To that end, in some implementations, the initial measurement module $204b$ generates audience duplication measurements for pairs of resources that are to be combined to determine total unique page groups across the resource.

Audience duplication measurements are measurements that represent the relationship between pairs of resources with respect to members of the audience that have used or accessed both resources. Audience duplication measurements may include a measurement of the correlation between the resources, as well as measurements of the fraction of audience overlap between the two resources. Various audience duplication measurements for a resource pair may be used to estimate or project audience usage in one member of the resource pair when the audience usage of the other member changes.

The initial measurement module $204b$ may generate audience duplication measurements, for example, by determining for each user or machine tracked by the panel data $132$, how many viewers are shown to have viewed both members of the pair. Each viewer then may be considered to only represent one unique view across the pair of resources. In this case, taking this audience duplication into account when assessing unique visitors across multiple entities may lead to more accurate measurements of unique visitors.

As an example, the following equations may use audience duplication measurements to generate combined reach measurements based on the panel data $132$ accessed by the pre-processing module $204a$ and generated by the initial measurement module $204b$. In order to calculate the combined reach, the following function can be used:

$$f_{1,2,3}(x_1,x_2,x_3) = p_1 p_2 p_3 * [1 + r_{1,2}(x_1-\mu_1)(x_2-\mu_2)/(\sigma_1\sigma_2) + r_{1,3}(x_1-\mu_1)(x_3-\mu_3)/(\sigma_1\sigma_3) + r_{2,3}(x_2-\mu_2)(x_3-\mu_3)/(\sigma_2\sigma_3)]$$

The above equation calculates the fraction $f_{1,2,3}$ of the total audience that encountered a specific number of unique views for each of three resources 1, 2, and 3. The variables $x_1$, $x_2$, and $x_3$ represent the number of views for each of the three entities, which may represent web resources or other vehicles. For example, if 12% of the total audience had one view for resource 1 ($x_1=1$), no views for resource 2 ($x_2=0$), and 2 views for resource 3 ($x_3=2$), then $f_{1,2,3}(1,0,2)=0.12$; similarly, if 30% of the total audience had no views for any of the three resources ($x_1=x_2=x_3=0$), then $f_{1,2,3}(0,0,0)=0.3$. Ideally the sum of the $f_{1,2,3}$ values for all ($x_1,x_2,x_3$) triplets should be 1.

The equation uses the mean number of views $\mu$ and standard deviation $\sigma$ of views for each resource. Further, each $p_i$ represents the individual reach for a given resource, expressed, like f, as a fraction of the total available audience.

The following part of the equation is an adjustment factor to the product of the individual reaches: $[1+r_{1,2}(x_1-\mu_1)(x_2-\mu_2)/(\sigma_1\sigma_2)+r_{1,3}(x_1-\mu_1)(x_3-\mu_3)/(\sigma_1\sigma_3)+r_{2,3}(x_2-\mu_2)(x_3-\mu_3)/(\sigma_2\sigma_3)]$. This particular example of the adjustment factor includes terms related to the three resources that are combined. In the event that the combined reach is being calculated across a greater number of resources, further pairwise terms are included such that a term exists for each pair of resources. Within the adjustment factor, each $r_{i,j}$ (also referred to as a pairwise correlation) is a coefficient representing the correlation of two of the resources, which can be calculated according to the following correlation equation:

$$r_{i,j} = (p_{ij} - p_i p_j)/\sqrt{[p_i(1-p_i)p_j(1-p_j)]}$$

Where $p_i$ and $p_j$ represent the individual reach as above, and $p_{ij}$ represents the duplicated audience for the two resources—that is, the fraction of the audience members that have viewed both of the resources. In some implementations, as in this example, the audience duplication measurements used to calculate the combined reach are the pairwise correlations for the pairs of resources. Although the above equation is given for three resources, the equation can be generalized for any number of resources. The product will include of each of the individual p values. In addition, as noted above, the adjustment factor will include a term for each pair of resources; for example, four resources will include six terms, and five resources will include ten terms.

Although the above equations have been found to provide an accurate assessment of reach under some conditions, certain circumstances have shown these equations to require further adjustment.

In some cases, the data may include some entities that are parents of other entities being measured, existing higher in the same hierarchy as described above. For example, one of the entities being measured may be all AOL sites (the "parent"), while another may be AOL Homepages, representing only a portion of AOL sites (the "child"). In these circumstances, every audience member that is found to have visited AOL Homepages should also be found to have visited AOL sites. Therefore, we expect the fraction of the sample that has visited the child resource to be equal to the fraction of the sample that has visited both the child resource and the parent resource (audience duplication being equal to one of the resource audiences, or $p_i = p_{ij}$ for the child resource i).

Returning to the process 300, the measurement adjustment module 204c determines that such a parent-child relationship exists between two of the measured resources (a resource pair) and may determine that such a relationship exists for multiple resource pairs (306). This determination may occur due to a known taxonomic relationship that is already part of the system, in which case the adjustment may occur automatically on a known set of resource pairs.

Alternatively or in addition, the determination may be inferred from the measurement data. For example, the identification may occur whenever the audience duplication $p_{ij}$ is substantially equal to either of the individual reaches $p_i$ or $p_j$. The entity that is substantially equal to the audience duplication is then identified as the child resource, and the other as the parent resource.

Under these circumstances, a calculation of combined reach that uses the above-described audience duplication measurements may be inaccurate, as they are designed to provide accurate estimates under conditions where the audience duplication is only a small to moderate portion of either individual reach. This inaccuracy manifests as a negative relationship between the parent-child pair and the resulting calculation of combined reach.

In response to determining that a pair of resources is a parent-child resource pair, the measurement adjustment module 204c modifies the audience duplication measurement associated with the parent-child resource pair to generate a modified audience duplication measurement (308). This may done, for instance, by employing a correction in the audience duplication measurement used for that resource pair. For parent resource 1 and child resource 2, the correction may be applied to the pairwise correlation coefficient, $r_{1,2}$, as follows:

$$r'_{1,2} = (1-p_2/p_1)*r_{1,2} = (1-p_2/p_1)*(p_{1,2}-p_1 p_2)/\sqrt{[p_1(1-p_1)p_2(1-p_2)]}$$

The adjusted pairwise correlation coefficient is multiplied by the complement of the ratio between the two individual reach values, $(1-p_2/p_1)$. The correction factor is therefore larger when the reach of the child resource is a relatively small portion of the total reach for the parent resource, approaching 1 as the relative size between the two increases. For a child resource nearing the parent resource in reach, the correction factor approaches zero, which significantly reduces the correlation coefficient. This compensates for situations in which, due to the individual reach of the child resource and the audience duplication both being close to the size of the parent resource, the entire term represented by the pairwise correlation coefficient has an overly large impact on the combined reach calculation.

Once the appropriate audience duplication measurements are determined, along with any other adjustments, the measurement adjustment module 204c determines the combined reach based at least on the usage data and the modified audience duplication measurement (310). The system may use non-modified audience duplication measurements and other data. The calculated combined reach may be output as part of the measurement data 206.

For instance, in some implementations, once the function $f_{1,2,3}(x_1,x_2,x_3)$ is calculated, substituting the corrected correlation coefficients r' for r where necessary, the combined reach of the resources is $1-f_{1,2,3}(0,0,0)$. As explained earlier, $f_{1,2,3}(0,0,0)$ represents the fraction of the total audience that has not viewed any of the resources. Therefore, one minus this fraction represents the fraction of the total audience that has viewed at least one of the resources, which is equal to the combined reach of the resources.

Once the adjusted usage measurement data is generated, including a combined reach, reports are generated using the adjusted measurement data (312). The adjustments used above, where useful, may be taken into account by the report generation module 208 in determining what data to include in the report.

For example the work generation module may include audience duplication information, indicating where audience duplication is highest between different entities, which may be used in establishing suggestions from where to allocate advertisements or other audience-related activities relative to different entities. Other projection information available in the reports may include an extrapolation as to how an audience increase in one resource may reflect an increase in the combined reach of multiple resources, using the above equations along with adjustments to indicate a combined reach value.

Figure 4:
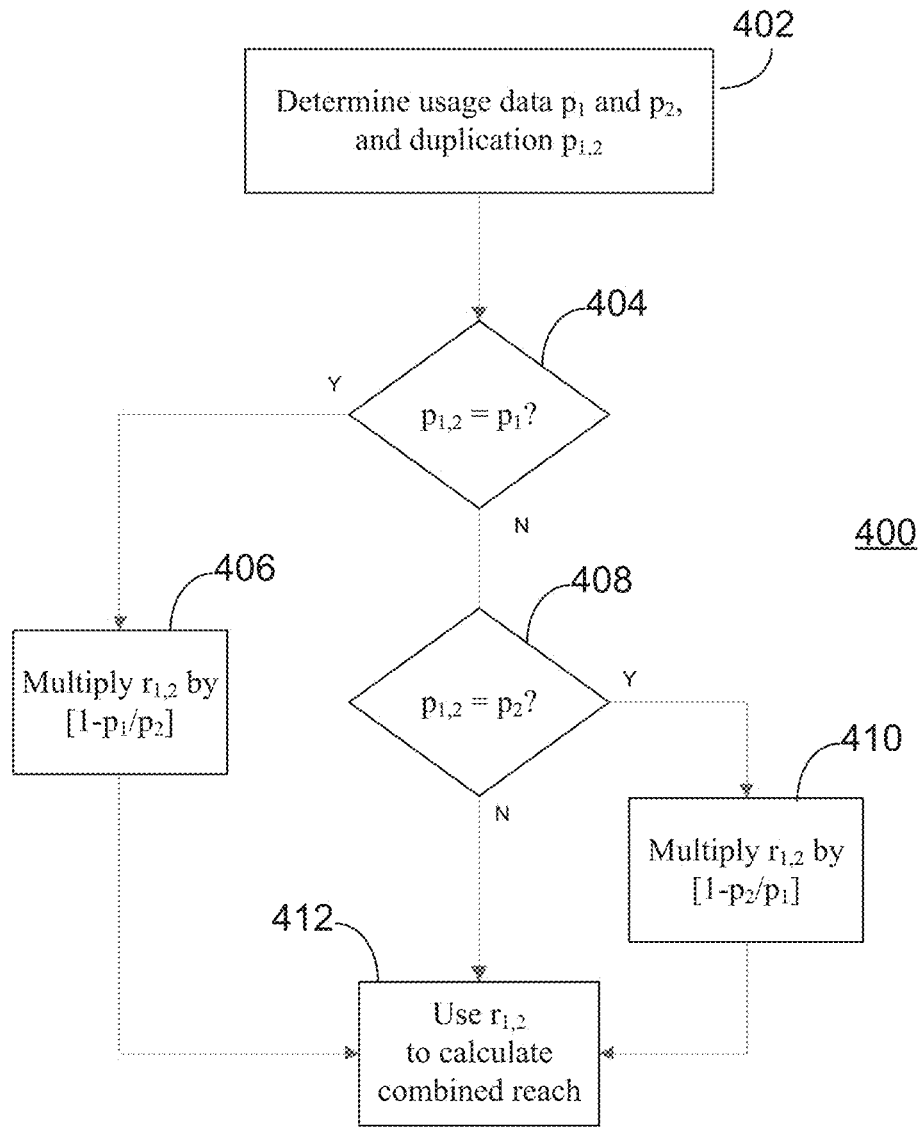
FIG. 4 is a flow chart illustrating an example of a process for determining an audience duplication adjustment factor for a parent-child resource pair.

In accordance with the description and equations above, FIG. 4 illustrates an example of a process 400 for evaluating whether to apply a correction factor to a pair of resources.

Usage data reflecting the individual reaches p1 and p2, as well as the audience duplication data p1,2, is used to make this evaluation (402). In this implementation, the individual reach of a child resource should be equal to the audience duplication of the child resource with the parent resource (that is, the same fraction that sees the child resource should be considered to have seen a member of the parent resource, since the child is a member of the parent).

If the audience duplication p1,2 is approximately equal to the individual reach of resource 1 (404), then resource 1 is considered to be the child resource. A correction factor (1−p1/p2) is applied to the correlation coefficient r1,2 as described above (406).

Otherwise, if the audience duplication p1,2 is approximately equal to the individual reach of resource 2 (408), then resource 2 is considered to be the child resource. A correction factor (1−p2/p1) is applied to the correlation coefficient r1,2 as described above (410). Whether or not a parent-child relationship correction was made, the correlation coefficient r1,2 is then used in calculating combined reach using, for instance, the techniques described above (412).

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A computer-implemented method comprising:
    accessing, by one or more processors, usage data that indicates accesses to a plurality of different resources by one or more members of an audience with one or more client systems and includes information about audience duplication across one or more of the plurality of different resources;
    generating, based on the usage data and by the one or more processors, audience duplication measurements for pairs of resources in the plurality of different resources;
    determining, by the one or more processors, that at least one of the pairs of resources is a parent-child resource pair, wherein a parent-child resource pair includes two resources with a parent-child relationship such that a first one of the two resources is a parent resource and a second one of the two resources is a child resource, the parent-child resource pair having an associated audience duplication measurement generated based on the usage data;
    in response to determining that at least one of the pairs of resources is a parent-child resource pair, modifying, by the one or more processors, the audience duplication measurement associated with the parent-child resource pair to generate a modified audience duplication measurement;
    determining, by the one or more processors, a combined reach representing a number of accesses of the plurality of different resources by unique members of the audience based at least on the usage data and the modified audience duplication measurement; and
    generating, by the one or more processors, a report based on the combined reach.

2. The computer-implemented method of claim 1, wherein the information about audience duplication included in the accessed usage data is correlation data calculated between each pair of the plurality of different resources, and wherein the audience duplication measurement associated with the parent-child resource pair is a pairwise correlation coefficient for the parent-child resource pair.

3. The computer-implemented method of claim 2, wherein modifying the pairwise correlation coefficient for the parent-child resource pair comprises multiplying the pairwise correlation coefficient by a factor based on a ratio between usage of the child resource and usage of the parent resource.

4. The computer-implemented method of claim 3, wherein the factor is proportional to $(1-p_c/p_p)$, wherein $p_c$ is the usage of the child resource and $p_p$ is the usage of the parent resource.

5. The computer-implemented method of claim 3, further comprising calculating an adjusted combined reach based on a product of a measured unique audience for each of the plurality of different resources multiplied by an adjustment factor, the adjustment factor being calculated using the modified pairwise correlation coefficients.

6. The computer-implemented method of claim 1, wherein determining that the parent-child relationship exists comprises identifying that the audience duplication of usage of the parent-child resource pair is equal to usage of the child resource.

7. The computer-implemented method of claim 1, wherein the child resource comprises one or more websites, and wherein the parent resource comprises all of the websites of the child resource and one or more other websites.

8. The computer-implemented method of claim 1, wherein the plurality of different resources are hosted on servers, and wherein the one or more members of the audience access the plurality of different resources using client systems that send requests for the plurality of different resources to the servers across a network.

9. The computer-implemented method of claim 1, wherein the combined reach is also determined based on one or more of the generated audience duplication measurements.

10. The computer-implemented method of claim 1, wherein the modification of the audience duplication measurement takes into account an observed negative relationship between a parent-child resource pair and combined reach such that the combined reach determined based on the modified audience duplication measurement is less than a combined reach determined using the same data but the unmodified audience duplication measurement.

11. A system comprising:
one or more computers and one or more storage devices storing instructions that are operable, when executed by the one or more computers, to cause the one or more computers to perform operations comprising:
accessing usage data that indicates accesses to a plurality of different resources by one or more members of an audience with one or more client systems and includes information about audience duplication across one or more of the plurality of different resources;
generating, based on the usage data, audience duplication measurements for pairs of resources in the plurality of different resources;
determining that at least one of the pairs of resources is a parent-child resource pair, wherein a parent-child resource pair includes two resources with a parent-child relationship such that a first one of the two resources is a parent resource and a second one of the two resources is a child resource, the parent-child resource pair having an associated audience duplication measurement generated based on the usage data;
in response to determining that at least one of the pairs of resources is a parent-child resource pair, modifying the audience duplication measurement associated with the parent-child resource pair to generate a modified audience duplication measurement;
determining a combined reach representing a number of accesses of the plurality of different resources by unique members of the audience based at least on the usage data and the modified audience duplication measurement; and
generating a report based on the combined reach.

12. The system of claim 11, wherein the information about audience duplication included in the accessed usage data is correlation data calculated between each pair of the plurality of different resources, and wherein the audience duplication measurement associated with the parent-child resource pair is a pairwise correlation coefficient for the parent-child resource pair.

13. The system of claim 12, wherein modifying the pairwise correlation coefficient for the parent-child resource pair comprises multiplying the pairwise correlation coefficient by a factor based on a ratio between usage of the child resource and usage of the parent resource.

14. The system of claim 13, wherein the factor is proportional to $(1-p_c/p_p)$, wherein $p_c$ is the usage of the child resource and $p_p$ is the usage of the parent resource.

15. The system of claim 13, wherein the one or more storage devices store instructions that are operable, when executed by the one or more computers, to cause the one or more computers to perform operations comprising calculating an adjusted combined reach based on a product of a measured unique audience for each of the plurality of different resources multiplied by an adjustment factor, the adjustment factor being calculated using the modified pairwise correlation coefficients.

16. The system of claim 11, wherein determining that the parent-child relationship exists comprises identifying that the audience duplication of usage of the parent-child resource pair is equal to usage of the child resource.

17. The system of claim 11, wherein the child resource comprises one or more websites, and wherein the parent resource comprises all of the websites of the child resource and one or more other websites.

18. The system of claim 11, wherein the plurality of different resources are hosted on servers, and wherein the one or more members of the audience access the plurality of different resources using client systems that send requests for the plurality of different resources to the servers across a network.

19. The system of claim 11, wherein the combined reach is also determined based on one or more of the generated audience duplication measurements.

20. The system of claim 11, wherein the modification of the audience duplication measurement takes into account an observed negative relationship between a parent-child resource pair and combined reach such that the combined reach determined based on the modified audience duplication measurement is less than a combined reach determined using the same data but the unmodified audience duplication measurement.

21. A non-transitory computer-readable medium storing software comprising instructions executable by one or more computers which, upon such execution, cause the one or more computers to perform operations comprising:
accessing usage data that indicates accesses to a plurality of different resources by one or more members of an audience with one or more client systems and includes information about audience duplication across one or more of the plurality of different resources;
generating, based on the usage data, audience duplication measurements for pairs of resources in the plurality of different resources;
determining that at least one of the pairs of resources is a parent-child resource pair, wherein a parent-child resource pair includes two resources with a parent-child relationship such that a first one of the two resources is a parent resource and a second one of the two resources is a child resource, the parent-child resource pair having an associated audience duplication measurement generated based on the usage data;
in response to determining that at least one of the pairs of resources is a parent-child resource pair, modifying the audience duplication measurement associated with the parent-child resource pair to generate a modified audience duplication measurement;
determining a combined reach representing a number of accesses of the plurality of different resources by unique members of the audience based at least on the usage data and the modified audience duplication measurement; and
generating a report based on the combined reach.

* * * * *